United States Patent Office 3,579,641
Patented May 25, 1971

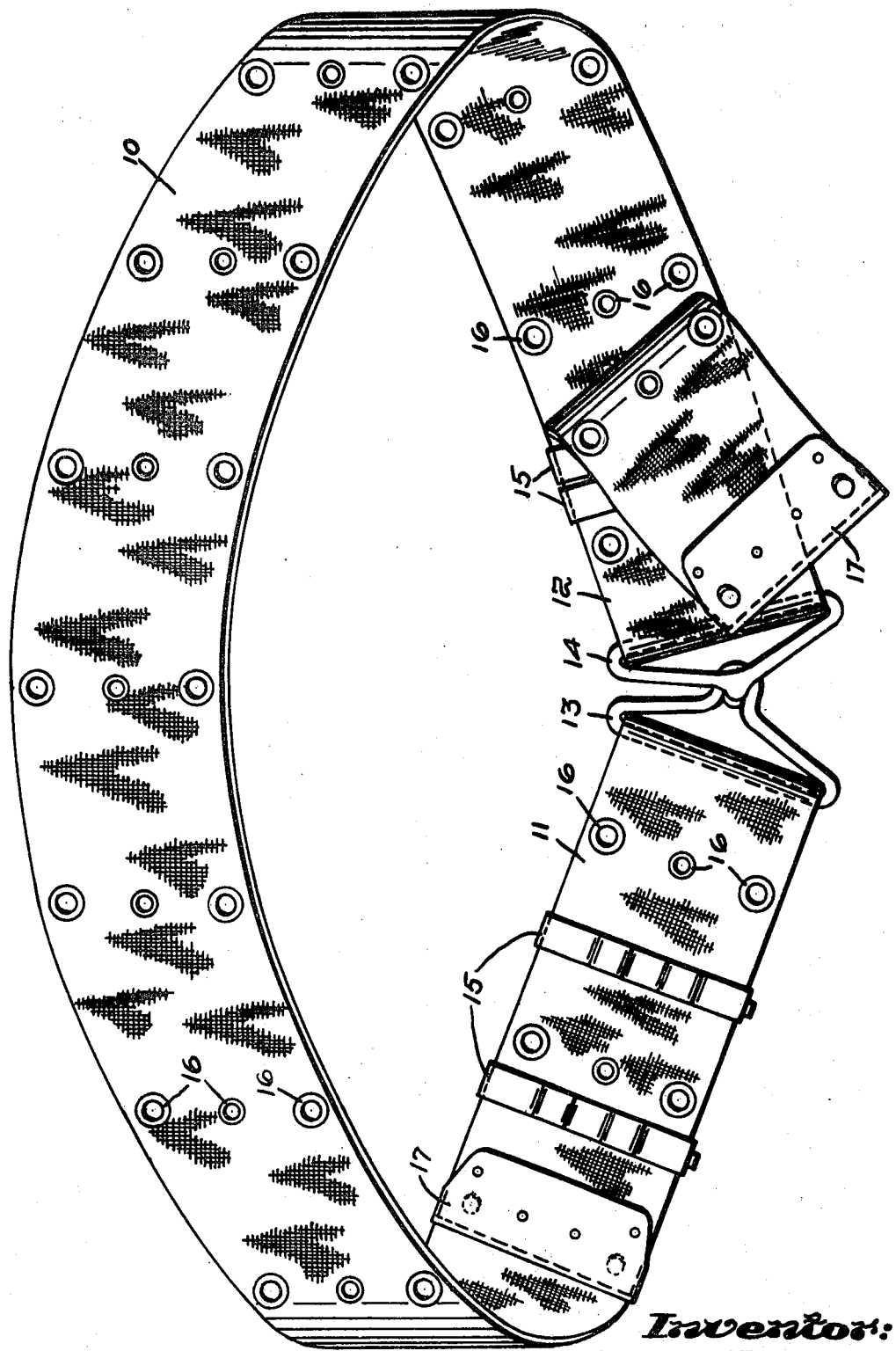

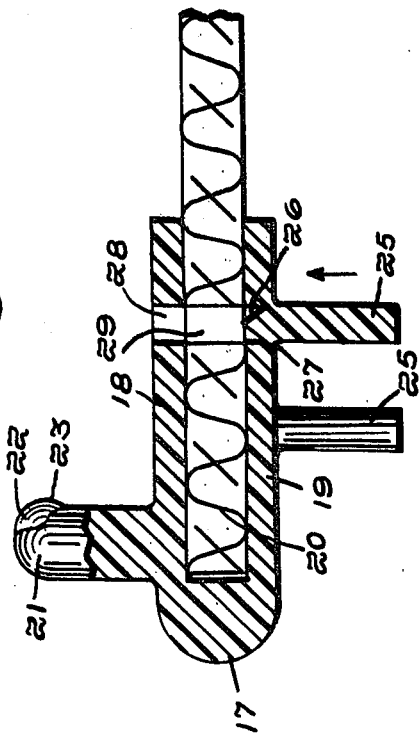
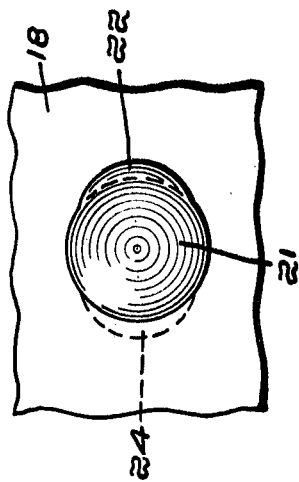
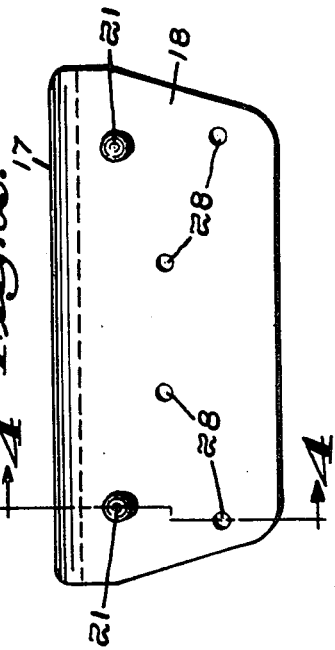
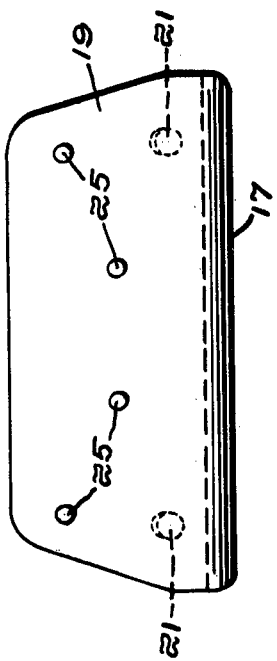

---

3,579,641
END CLIP FOR LOAD CARRYING BELT
Wesley S. Larson, Hazardville, Conn., assignor to the United States of America as represented by the Secretary of the Army
Filed Oct. 9, 1969, Ser. No. 864,992
Int. Cl. A41f 9/02, 19/00
U.S. Cl. 2—325                                     4 Claims

ABSTRACT OF THE DISCLOSURE

An end clip for attachment to an end of load carrying belt to serve as means for varying the length of the belt. The end clip has prongs formed on an outer surface thereof, the prongs being releasably engagable with eyelets in the belt forming a loop in the belt of variable size which carries a portion of means for fastening the belt about the body. The end clip is preferably made of rigid plastic material with pins and openings to receive the pins formed as elements thereof during molding of the end clip, the pins serving to affix the end clip to an end of the belt.

---

The invention described herein may be manufactured, used, and licensed by or for the Government for governmental purposes without the payment to me of any royalty thereon.

This invention relates to an end clip for a load carrying belt which is adjustable in length. The end clip serves as a detachable fastening means for forming a loop of variable size at an end of the belt, thus permitting the belt length to be varied.

The pistol belt used by the Armed Forces has for a good many years been constructed of webbing, usually made of cotton yarn, having eyelets spaced apart along the webbing and passing therethrough for attachment of articles to be carried or supported by the belt and for permitting adjustment of the length of the belt by cooperation with a hook on an end clip attached to the end of the belt. Until recently the end clip has been made of metal, usually steel, having a single hook thereon which cooperates with a row of eyelets spaced apart along the midline of the belt. Each belt is provided with an end clip fastened to each end of the belt which permits folding each end back upon itself to form a loop adjustable in size. Each loop carries one portion of a separable means for fastening the ends of the belt together for the purpose of suspending the belt about the waist of the wearer.

It is an object of the invention to provide an improved end clip for a load carrying belt having means formed thereon for releasably engaging the eyelets spaced along the belt.

Another object is to provide an improved end clip which can be molded in one piece of plastic material.

Other objects and advantages will become apparent from the description of the invention hereinafter and the accompanying drawings wherein:

FIG. 1 is a perspective view of a load carrying belt having an end clip in accordance with the invention fixedly mounted on each end of the belt;

FIG. 2 is a top plan view of an end clip of the invention prior to mounting thereof on an end of the belt;

FIG. 3 is a bottom plan view of an end clip of the invention prior to mounting thereof on an end of the belt;

FIG. 4 is a cross section of the end clip taken along the line 4—4 in FIG. 2, showing an end of the belt inserted between the arms of the end clip prior to the fixation of the plastic rivets in registering openings in the arms of the end clip; and FIG. 5 is an enlarged end view of one of the prongs on one of the end clips of the invention, the exterior surface of the arm of the end clip on which the prong is formed being broken away.

As seen in FIG. 1, a pistol belt 10, which is a load carrying belt and which is usually made of webbing, is shown with two ends thereof forming loops 11 and 12 by the folding of the ends back upon themselves. Loop 11 passes through and carries a first portion 13 of a belt fastener and loop 12 passes through and carries a second portion 14 of a belt fastener, the belt fastener being customarily fastened at the front of the body of the wearer of the belt. The belt is adjusted in length to fit about the waist portion of the body to serve as a support for pistol holsters, ammunition pockets, as well as other equipment required to be carried on the person of a soldier or other individual wearing such a belt. Each loop passes through one or more keepers 15 which serve to hold the end portions of the loops in close relationship to the main portion of the belt and to prevent loss of the portions of the belt fastener from the loops when the ends of the belt are unfastened as when an adjustment in length of the belt is being made. In FIG. 1 for convenience only in showing the structure of an end clip after affixing thereof to each end of the belt, the end forming a portion of loop 12 is folded back to show the opposite face of the end clip from that of the end clip on the end forming a portion of loop 11.

The webbing of the belt is provided with numerous eyelets 16, usually made of metal, passing through and tightly gripping the webbing. These eyelets are customarily arranged in three parallel rows lengthwise of the webbing of the belt and in rows, usually of three eyelets, transversely of the webbing, the transverse rows being spaced approximately 2½ inches apart. These eyelets serve a variety of purposes such as receiving hooks or other types of extensions employed in supporting holsters or pockets or in detachably fastening an end of the belt to the main portion of the belt after formation of a loop at the end of the belt.

The novelty of the present invention lies in the end clip 17 which is mounted on each end of the belt 10 and serves to detachably fasten each end of the belt to the main portion of the belt and to protect the end of the webbing against unraveling.

As seen in FIGS. 2–5, the end clip 17 is generally U shaped in cross section. It is made of substantially rigid material which, however, must be sufficiently flexible to permit the arms 18 and 19 of the U shaped structure to be pried apart sufficiently to permit the end 20 of the belt 10 to be inserted therebetween. The end clip has two prongs 21 formed on the exterior surface of arm 18 thereof, each prong being spaced slightly inwardly from one of the side edges of the end clip, the spacing of the prongs one from the other being such that one of the prongs will fit snugly in one of the eyelets near one of the outer edges of the 2. End clip as in claim 1, wherein said prongs are formed on the exterior surface of one of the arms of said U shaped member.

3. End clip as in claim 2, wherein each of said prongs is provided with a projection formed near the free end thereof, said projection comprising detent means to releasably retain said prong engaged in one of said eyelets.

4. End clip as in claim 1, wherein said plastic attaching means is a thin plastic web.

References Cited

UNITED STATES PATENTS

| | | | |
|---|---|---|---|
| 730,846 | 6/1903 | Turner | 24—176 |
| 1,055,045 | 3/1913 | Hunter | 24—176 |
| 2,419,662 | 4/1947 | Sutton | 24—186 |
| 3,279,014 | 10/1966 | Fischer | 24—115 |
| 3,448,464 | 6/1969 | Jonas | 24—265X |

FOREIGN PATENTS

| | | | |
|---|---|---|---|
| 8,796 | 4/1910 | Great Britain | 24—176 |

JORDAN FRANKLIN, Primary Examiner

G. V. LARKIN, Assistant Examiner

U.S. Cl. X.R.

24—176, 186, 265